(12) United States Patent
Taboryski et al.

(10) Patent No.: US 8,268,260 B2
(45) Date of Patent: Sep. 18, 2012

(54) CAPILLARY STOP

(75) Inventors: Rafael Taboryski, Bagsvaerd (DK); Jonatan Kutchinsky, Ballerup (DK)

(73) Assignee: Sophion Bioscience A/S, Ballerup (DK)

( * ) Notice: Subject to any disclaimer, the term of this patent is extended or adjusted under 35 U.S.C. 154(b) by 1127 days.

(21) Appl. No.: 10/546,457

(22) PCT Filed: Feb. 23, 2004

(86) PCT No.: PCT/IB2004/001031
§ 371 (c)(1),
(2), (4) Date: Jul. 17, 2006

(87) PCT Pub. No.: WO2004/074829
PCT Pub. Date: Sep. 2, 2004

(65) Prior Publication Data
US 2006/0251544 A1    Nov. 9, 2006

(30) Foreign Application Priority Data

Feb. 21, 2003    (GB) .................................. 0303920.3

(51) Int. Cl.
*B01L 3/00*    (2006.01)
(52) U.S. Cl. ........ 422/500; 422/501; 422/502; 422/503; 215/11.1; 347/54; 347/71
(58) Field of Classification Search ............ 422/99–100, 422/500–503; 436/180; 215/11.1; 347/54, 347/71
See application file for complete search history.

(56) References Cited

U.S. PATENT DOCUMENTS

| 5,368,729 | A | * | 11/1994 | Stefkovich et al. ............ 210/266 |
| 6,588,613 | B1 | * | 7/2003 | Pechenik et al. .............. 215/11.1 |
| 2002/0063067 | A1 | * | 5/2002 | Bech et al. ..................... 205/775 |
| 2002/0117517 | A1 | | 8/2002 | Chou et al. |
| 2002/0144905 | A1 | | 10/2002 | Schmidt |
| 2002/0166585 | A1 | | 11/2002 | O'Connor et al. |
| 2004/0144744 | A1 | * | 7/2004 | Holley, Jr. .................... 215/11.1 |

FOREIGN PATENT DOCUMENTS

| EP | 0 672 834 A | 9/1995 |
| EP | 1226871 A2 | 7/2002 |
| WO | WO-01/25769 A | 4/2001 |
| WO | WO-01/25769 A2 | 4/2001 |
| WO | WO-02/29402 A | 4/2002 |

OTHER PUBLICATIONS

Man, P.F. et al., Micro Electro Mechanical Systems, 1998, Mems 98. Proceedings, The Eleventh Annual International Workshop on Heidelberg, Germany, Jan. 25-29, 1998, pp. 45-50.
Richter, M. et al., Sensors and Actuators A, Elsevier Sequoia S.A., Lausanne, CH, vol. 68, No. 1-3, Jun. 15, 1998, pp. 480-486.

* cited by examiner

*Primary Examiner* — Jyoti Nagpaul
(74) *Attorney, Agent, or Firm* — Birch, Stewart, Kolasch & Birch, LLP

(57) ABSTRACT

A microfluidics system comprising a channel having an inlet (32) and an outlet (38); a first membrane (31) positioned between the inlet (32) and outlet (38) and comprising an aperture having a radius within the range 0.1 to 50 μm, the inlet (32) and the outlet (38) being in hydraulic communication with one another, such that a fluid can move along the channel from the inlet to the outlet.

15 Claims, 9 Drawing Sheets

CAPILLARY STOP

This invention relates to a system having one or more fluidic channels with sub-millimeter dimensions. Such systems are used within the fields of chemistry, biochemistry, molecular and cell biology and are often termed microfluidic systems.

Systems to which the present invention relate may be used to monitor electrophysiological properties of ion channels in ion channel-containing structures, typically lipid membrane-containing structures such as cells, by establishing an electrophysiological measuring configuration in which a cell membrane forms a high resistive seal around the measuring electrode, making it possible to determine and monitor a current flow through the cell membrane. Such systems can form part of an apparatus for carrying out patch clamp techniques utilised to study ion transfer channels and biological membranes, for example.

The general idea of electrically insulating a patch of membrane and studying the ion channels in that patch under voltage-clamp conditions is outlined in Neher, Sakmann, and Steinback (1978) "The Extracellular Patch Clamp, A Method For Resolving Currents Through Individual Open Channels In Biological Membranes", Pflüger Arch. 375; 219-278. It was found that, by pressing a pipette containing acetylcholine (ACh) against the surface of a muscle cell membrane, one could see discrete jumps in electrical current that were attributable to the opening and closing of ACh-activated ion channels. However, the researchers were limited in their work by the fact that the resistance of the seal between the glass of the pipette and the membrane (10-50 MΩ) was very small relative to the resistance of the channel (10 GΩ). The electrical noise resulting from such a seal is inversely related to the resistance and, consequently, was large enough to obscure the currents flowing through ion channels, the conductance of which are smaller than that of the ACh channel. It also prohibited the clamping of the voltage in the pipette to values different from that of the bath due to the resulting large currents through the seal.

It was then discovered that by fire polishing the glass pipettes and by applying suction to the interior of the pipette a seal of very high resistance (1 to 100 GΩ) could be obtained with the surface of the cell, thereby reducing the noise by an order of magnitude, to levels at which most channels of biological interest can be studied and greatly extended the voltage range over which these studies could be made. This improved seal has been termed a 'gigaseal', and the pipette has been termed a 'patch pipette'. A more detailed description of the gigaseal may be found in O. P. Hamill, A. Marty, E. Neher, B. Sakmann & F. J. Sigworth (1981) "Improved patch-clamp techniques for high resolution current recordings from cells and cell-free membrane patches." Pflügers Arch. 391, 85-100. For their work in developing the patch clamp technique, Neher and Sakmann were awarded the 1991 Nobel Prize in Physiology and Medicine.

Ion channels are transmembrane proteins which catalyse transport of inorganic ions across cell membranes. The ion channels participate in processes as diverse as generating and timing action potentials, synaptic transmission, secretion of hormones, contraction of muscles, etc. Many pharmacological agents exert their specific effects via modulation of ion channels. Examples include antiepileptic compounds such as phenytoin and lamotrigine, which block voltage-dependent Na+-channels in the brain, antihypertensive drugs such as nifedipine and diltiazem, which block voltage dependent Ca2+-channels in smooth muscle cells, and stimulators of insulin release such as glibenclamide and tolbutamide, which block an ATP-regulated K+-channel in the pancreas. In addition to chemically-induced modulation of ion-channel activity, the patch clamp technique has enabled scientists to perform manipulations with voltage-dependent channels. These techniques include adjusting the polarity of the electrode in the patch pipette and altering the saline composition to moderate the free ion levels in the bath solution.

The patch clamp technique represents a major development in biology and medicine, since it enables measurement of ion flow through single ion channel proteins, and also enables the study of a single ion channel activity in response to drug exposure. Briefly, in standard patch clamping, a thin (approx. 0.5-2 µm in diameter) glass pipette is used. The tip of this patch pipette is pressed against the surface of the cell membrane. The pipette tip seals tightly to the cell membrane and isolates a small population of ion channel proteins in the tiny patch of membrane limited by the pipette orifice. The activity of these channels can be measured individually ('single channel recording') or, alternatively, the patch can be ruptured, allowing measurements of the channel activity of the entire cell membrane ('whole-cell configuration'). High-conductance access to the cell interior for performing whole-cell measurements can be obtained by rupturing the membrane by applying negative pressure in the pipette.

As discussed above, an important requirement for patch clamp measurements of single-channel currents is the establishment of a high-resistance seal between the cell membrane and the glass micropipette tip, in order to restrict ions from moving in the space between the two surfaces. Typically, resistances in excess of 1 GΩ are required, hence the physical contact zone is referred to as a 'gigaseal'.

Formation of a gigaseal requires that the cell membrane and the pipette glass are brought into close proximity to each other. Thus, while the distance between adjacent cells in tissues, or between cultured cells and their substrates generally, is in the order of 20-40 nm (Neher, 2001), the distance between the cell membrane and the pipette glass in the gigaseal is predicted to be in the Angstrom (i.e. 10-10 m) range. The physio-chemical nature of the gigaseal is not known. However, gigaseals may be formed between cell membranes and a wide variety of glass types including quartz, aluminosilicate, and borosilicate (Rae and Levis, 1992), indicating that the specific chemical composition of the glass is not crucial.

Cell membranes are composed of a phospholipid bilayer with intercalated glycoproteins, the latter serving a multitude of functions including acting as receptors for various agents. These membrane-spanning glycoproteins typically comprise peptide- and glyco-moieties which extend out from the membrane into the extracellular space, forming a so-called 'glycocalyx' layer around the phospholipid bilayer which reaches a height of 20 to 50 nm and creates an electrolyte-filled compartment adjacent to the phospholipid bilayer. Thus, the glycocalyx forms a hydrophilic and negatively charged domain constituting the interspace between the cell and its aqueous environment.

Recent developments in patch clamp methodology have seen the introduction of planar substrates (e.g a silicon chip) in place of conventional glass micro pipette (for example, see WO 01/25769 and Mayer, 2000).

A typical microfluidic system comprises a pump and a measurement apparatus connected via a fluidic channel to the pump. In some systems, both the pump and the measurement apparatus have dimensions of the order of a few micrometers. With such systems it is known to be necessary to apply external pressures of up to several atmospheres in order to prime the system.

Priming is defined as the process where the air initially present in the system is replaced by liquid. Because of the sub-millimeter dimensions of the fluidic channels, forces exerted due to surface tension of the fluid within the channels become more and more significant and can pose problems during the priming process.

Some known microfluidic systems comprise an external pump controlling the pressure exerted on the measurement systems.

In some known microfluidic systems, the pump is formed integrally with, or is closely associated with the microfluidic system. Such pumps are known as micropumps.

In certain situations, the air flow resistance in the measurement apparatus is large compared with the volume of the interconnecting fluidic channel. This means that an excessively long length of time is needed for the priming process, in particular for venting out air originally present in, the fluidic channels.

According to a first aspect of the present invention there is provided a microfluidics system for determining and/or monitoring of electrophysiological properties of ion channels, in ion channel containing structures comprising:
 a channel having an inlet and an outlet;
 a first membrane positioned between the inlet and outlet and comprising an aperture having a radius within the range 0.1 to 50 µm, the inlet and the outlet being in hydraulic communication with one another, such that a fluid can move along the channel from the inlet to the outlet;
 pressure means for creating a pressure difference between the inlet and the outlet, whereby, in use movement of a fluid within the channel will be halted at the first membrane, due to a surface tension created in the fluid at the aperture, until the pressure means creates a pressure difference between the inlet and the outlet that exceeds the surface tension created at the aperture.

The present invention makes use of the pressure exerted by the surface tension of a liquid surface in a small orifice or aperture.

The present invention thus solves or reduces problems inherent in the priming process of most microfluidic systems, by introducing a capillary force based liquid stop in the fluidic path.

Conveniently, the first membrane comprises a plurality of apertures, although in certain embodiments, the first membrane may comprise a single aperture only.

Advantageously, the pressure means comprises a pumping device, the system further comprising an enclosed first volume positioned between the inlet and outlet, a second volume in hydraulic communication with the first volume; the pumping device being in hydraulic communication with the first and second volumes, for pumping fluid through the system or for exerting a hydraulic pressure difference between the first and second volume, the first membrane being positioned between the outlet and the first volume.

In certain situations it may be advantageous to have a system comprising more than one membrane. Conveniently, the system further comprises a second membrane comprising an aperture having a radius within the range 0.1 to 50 µm, and being positioned between the inlet and the first volume.

Preferred and advantageous features of the invention will readily become apparent from the dependent claims appended hereto.

According to a second aspect of the present invention, there is provided a membrane forming a microfluidic system for determining and/or monitoring of electrophysiological properties of ion channels, in an ion channel structures the system comprising a channel having an inlet and an outlet;
 a first membrane positioned between the inlet and outlet and comprising an aperture having a radius within the range 0.1 to 50 µm, the inlet and the outlet being in hydraulic communication with one another, such that a fluid can move along the channel from the inlet to the outlet.

According to a further aspect of the present invention, there is provided a device for taking electrophysiological measurements, the device comprising a microfluidic system comprising a channel having an inlet and an outlet;
 a first membrane positioned between the inlet and outlet and comprising an aperture having a radius within the range 0.1 to 50 µm, the inlet and the outlet being in hydraulic communication with one another, such that a fluid can move along the channel from the inlet to the outlet.

According to yet another aspect of the present invention, there is provided a method of priming a system comprising a microfluidics system comprising:
 a channel having an inlet and an outlet;
 a first membrane positioned between the inlet and outlet and comprising an aperture having a radius within the range 0.1 to 50 µm, the inlet and the outlet being in hydraulic communication with one another, such that a fluid can move along the channel from the inlet to the outlet.

FIGS. 1a and 1c show the cross section of a single aperture formed in a silicon membrane 12 where the thickness L of the membrane 12 is much less than the aperture radius r. In FIG. 1 the region below the membrane is flooded with liquid while the region above the membrane is filled with air. The liquid and air are separated by a liquid surface 13 that has the shape of a spherical cap. The angle θ is formed between the membrane surface and the tangent of the liquid surface at its contact point with the membrane.

The free energy of a liquid surface is given by $F=\sigma \cdot S$, where $\sigma$ is the surface tension constant and S is the surface area. In particular $\sigma=0.073$ J/m$^2$ for water. The pressure exerted by the surface tension is given by the derivative of the free energy F with respect to the volume V.

The water surface emerging from an aperture of diameter r takes on the shape of a spherical cap, since this is the shape with the minimal surface area for a given volume. The volume of the cap is $$V = \frac{1}{3} \cdot \pi \cdot r^3 \cdot \frac{(1-x)^2 \cdot (2-x)}{(1-x^2)^{\frac{3}{2}}}$$

The surface of the cap is $$S = 2 \cdot \pi \cdot r^2 \cdot \frac{1-x}{1-x^2}$$

where $x=\cos(\theta)$. The pressure exerted by the droplet is $p=\sigma \cdot dS/dV$, giving $$p = \frac{2 \cdot \sigma}{r} \cdot P(\theta)$$

where the dimensionless angle dependent factor $P(\theta)$ is defined as $$P(\theta) = \frac{3 \cdot \sin(\theta)}{5 - 4 \cdot \cos(\theta)}$$

A characteristic pressure $p_o = 2 \cdot \sigma/r$ may also be defined.

The function $P(\theta)$, which is plotted in FIG. 2, has a maximum for approximately $\theta = 37°$ and a minimum for approximately $\theta = -37°$. The angles $\pm 180°$ where the pressure is zero correspond to situations where the aperture, and nearest membrane surface, are either fully wetted or fully dry. In these situations the surface tension plays no role for the fluid flow around the aperture, and the liquid flow is unhindered. This state is termed the open state of the aperture.

In other situations a water meniscus is localised at the rim of the aperture (or pore). This corresponds to an interval of angles around $\theta = 0°$. In this case the liquid flow is hindered, and the aperture will act as a seal between the top and the bottom side of the membrane. This state is termed the sealing state of the aperture. If initially, the device is dry, and then the space on one side of the membrane is gradually filled with liquid at a pressure much lower than $p_o$ the aperture will automatically reach the sealing state and stop the flow, if an interior surface of the membrane defining the aperture is hydrophilic.

It is important to analyse the situation where the region below the membrane is filled with liquid and the region above the membrane is filled with air, the aperture being in the sealing state. If the pressure is gradually increased from zero pressure, the seal will be broken by two situations. In the first case the contact angle parameter of the liquid/membrane surface $\tau$ is larger than $37°$. The meniscus will then be stable until $\theta$ reaches $37°$, corresponding to a pressure of $p_0$. At this point the meniscus will become unstable, and will continue to increase until the topside of the membrane is flooded.

In the second case $\tau < 37°$ which corresponds to a very hydrophilic material, the seal will hold until $\theta$ reaches $\tau$, corresponding to a pressure of $p_o \cdot P(\tau)$. At this point the meniscus will no longer be localised at the rim of the aperture, and the meniscus will start to spread out over the top membrane surface.

If the pressure is gradually decreased from zero pressure, the seal will be broken by two similar situations. In the first case $180° - \tau > 37°$. The liquid surface will then be stable until $\theta$ reaches $-37°$ corresponding to a pressure of $-p_o$. At this point the surface will become unstable, and an air bubble will continue to increase in size below the aperture. In the second case $180° - \tau < 37°$ which corresponds to a very hydrophobic material, the seal will hold until $\theta$ reaches $180° - \tau$, corresponding to a pressure of $-p_o \cdot P(180° - \tau)$. At this point the surface will become unstable, and the air will spread out over the bottom membrane surface.

The maximum pressures the seal is able to withstand are termed the positive and negative holding pressures. The positive holding pressure is thus $p_o$ for $\tau > 37°$ and $p_o \cdot P(180 - \tau)$ for $\tau < 37°$, and the negative holding pressure is $p_o$ for $180 - \tau > 37°$ and $p_o \cdot P(180° - \tau)$ for $180° - \tau < 37°$. Typical calculated holding pressures are summarised in the tables below, when the liquid is water and the membrane is glass ($\tau = 14°$), or polymethylmethacrylate (PMMA $\tau = 70°$). The contact angle values are taken from reference 1.

TABLE 1

Holding pressures for water on a glass membrane

| Aperture radius (µm) | Positive holding pressure (mbar) | Negative holding pressure (mbar) |
|---|---|---|
| 0.1 | 9471 | 14600 |
| 0.3 | 3157 | 4867 |
| 0.5 | 1894 | 2920 |
| 1 | 947 | 1460 |
| 2 | 474 | 730 |
| 2.5 | 379 | 584 |
| 3.5 | 271 | 417 |
| 5 | 189 | 292 |
| 7 | 135 | 209 |
| 10 | 95 | 146 |
| 20 | 47 | 73 |
| 50 | 19 | 29 |
| 100 | 9 | 15 |

TABLE 2

Holding pressures for water on a PMMA membrane.

| Aperture radius (µm) | Positive holding pressure (mbar) | Negative holding pressure (mbar) |
|---|---|---|
| 0.1 | 14600 | 14600 |
| 0.3 | 4867 | 4867 |
| 0.5 | 2920 | 2920 |
| 1 | 1460 | 1460 |
| 2 | 730 | 730 |
| 2.5 | 584 | 584 |
| 3.5 | 417 | 417 |
| 5 | 292 | 292 |
| 7 | 209 | 209 |
| 10 | 146 | 146 |
| 20 | 73 | 73 |
| 50 | 29 | 29 |
| 100 | 15 | 15 |

The calculations can be repeated for other aperture shapes, but will arrive at the same basic result. Increasing the membrane thickness L does not change the holding pressure of the aperture. A more rounded aperture cross section also gives the same basic result, but with an effective aperture radius being larger than at the narrowest point of the aperture. The magnitude of the effective radius depends on the contact angle of the membrane surface material.

An array of identical apertures in the membrane has the same holding pressures as a single aperture, but with the advantage of having a larger flow conductance for air and liquid. An array is therefore preferred because it can give a less hindered flow in the open state, and therefore a greater contrast between the open and the sealed state. If there is a variation in the aperture diameters of the array, the holding pressure will be determined by the largest of the apertures.

FIGS. 3a to 3d shows a cross section of a membrane 30 according to the invention in various configurations of the sealing state. In these configurations the space below the membrane 32 is wetted while the space above the membrane 34 is filled with air. Liquid and air are separated by the liquid surface indicated by the thin line 36. In FIGS. 3a and 3b the topside 38 of the membrane is dry. In FIG. 3a there is a positive pressure from the rear, and in FIG. 3b there is a negative pressure from the rear. In these cases the device is able to hold pressures as shown in Tables 1 and 2 above.

In FIGS. 3c and 3d the topside 38 of the membrane is wetted. This situation can occur if a sealing state has been broken previously, and liquid has passed through the device. In FIG. 3c, there is a negative pressure from the rear, and the device will be able to hold the same pressure as in the state of FIG. 3b. This is not the case in FIG. 3d where a positive pressure is applied from the rear. A droplet will be present on the topside 38 of the membrane with a diameter corresponding to the total size of the apertures in the array. The surface tension of the droplet will still be able to hold some positive pressure, corresponding to the radius of the droplet. If the aperture array, for example, covers an area of 100×100 µm, the droplet will have a radius of the order of 50 µm, and will, for a glass surface, be able to hold a positive pressure of approximately 20 mbar.

Advantageously, the membrane material is formed from a hydrophilic material suitable for micropatterning such as oxidised silicon, silicon nitride, glass, silica, alumina, oxidised aluminium or acrylic.

This reduction of functionality of the device by the wetting of both sides can be surpassed by optionally coating the intended dry side of the membrane with a hydrophobic material, for example (but not limited to) PTFE or PDMS, while keeping the intended wet side hydrophilic.

Preferably the thickness of the membrane falls within the range of 50 to 400 nm when the membrane is formed from silicon nitride, 1 to 20 µm when the membrane is formed from oxidised silicon, 2 to 200 µm for glass or silica, and 5 to 500 µm for alumina or a plastics material.

Advantageously, the radius of the apertures falls within the range of 0.1 to 50 µm. In systems requiring pressures in the 100 to 1000 mbar range the aperture radius may fall within the range of 1 to 50 µm.

Preferably, for a membrane formed from oxidised silicon, the radius is in the range 1 to 3 µm. When the membrane is formed from a plastics material, the radius of the aperture will fall within the range 25 to 100 µm.

The invention will now be further described by way of example only with reference to the accompanying drawings in which:

FIG. 1b and 1c are schematic representations showing different possible shapes of the aperture shown in FIG. 1a;

FIG. 2 is a chart showing the dimensionless angle dependent factor P (θ) for the membrane shown in FIG. 1a;

Figure 4:
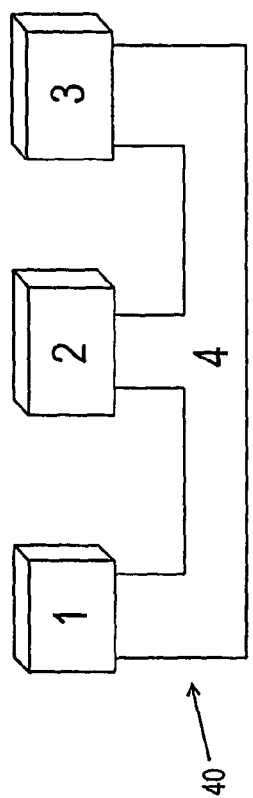
FIG. 4 is a microfluidic system according to an embodiment of the present invention.

Referring to FIG. 4 a microfluidic system according to the present invention is designated generally by the reference numeral 40. The system is particularly appropriate for use with an external pump. The system 40 comprises a measurement apparatus 1 and a pump 2, which in this example is an external gas pressure pump. The measuring device 1 and the pump 2 are interconnected by a fluidic channel 4. The system 40 further comprises a membrane 3 in accordance with the present invention. The presence of the membrane 3 means that liquid can be introduced through the membrane 3, but at the completion of the priming process, the membrane 3 will seal off the inlet of the system. This is necessary to ensure a correct operation of the pump, which would otherwise be short circuited.

In some cases the air flow resistance of the pump 2 and the measurement apparatus 1 is large compared with the volume of the interconnecting channel 4, resulting in an excessive time requirement for the priming process.

Figure 5:
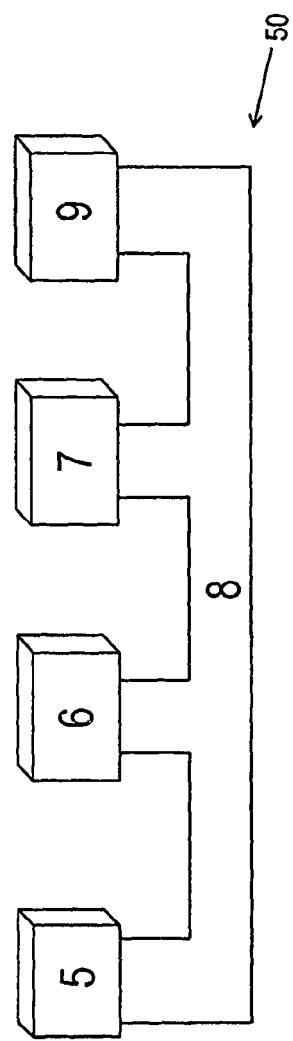
FIG. 5 is a schematic representation of a microfluidic system according to a second embodiment of the present invention.

A second embodiment of a system according to the present invention is designated generally in FIG. 5 by the reference numeral 50. In this example, the system 50 comprises a membrane 5 for introducing liquid into the system 50. The system 50 further comprises a pump 6, for example an electroosmotic pumping device, and a measurement apparatus 7 connected to the pump 6 by means of an interconnecting channel 8. The system 50 further comprises a second membrane 9 in accordance with the present invention which serves as an outlet for air contained within the system 50, allowing air to vent from the system. On completion of the priming process the two membranes 5, 9 will seal the system 50 enabling the micropump 6 to exert pressure on the measurement system.

Figure 6A:
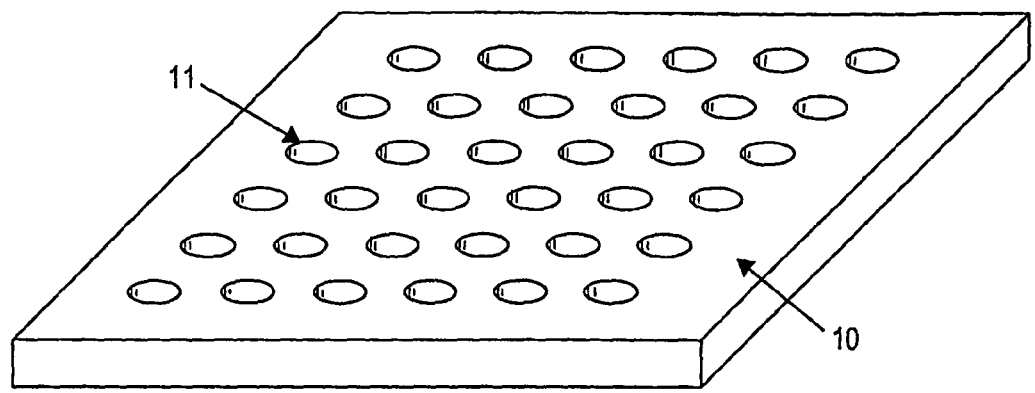
FIGS. 6a, 6b & 6c are schematic representations of a membrane forming part of a microfluidic system according to the present invention which membrane comprises an array of apertures.
Figure 6B:
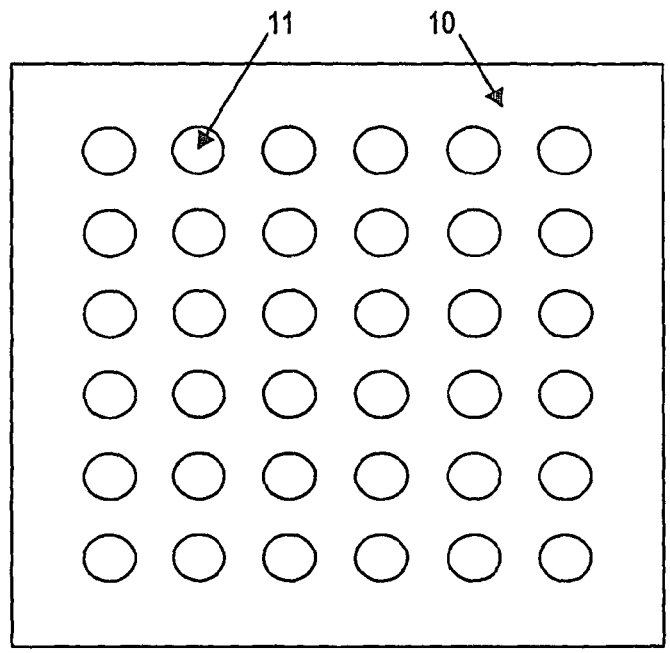
Figure 6C:
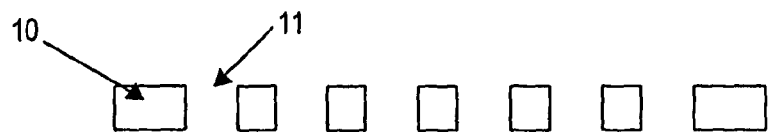

Referring now to FIGS. 6a, 6b and 6c, a membrane according to the present invention is designated generally by the reference numeral 10. The membrane 10 comprises an array of penetrating apertures 11. The positioning of the apertures in the membrane may be arbitrary, so long as the membrane maintains its mechanical stability. There is therefore, no need to accurately locate the apertures 11 within the membrane 10.

The membrane thickness is not critical to the functioning of the membrane, but should in general be as small as possible to ensure a low flow resistance through the membrane, whilst at the same time ensuring the mechanical stability and ease of manufacturing.

Since the holding pressure is determined by the radius of the largest aperture, the radii of apertures should be chosen so that they fit with the hydrostratic pressures needed in the particular microfluidic system in which the membrane is incorporated.

Figure 7:
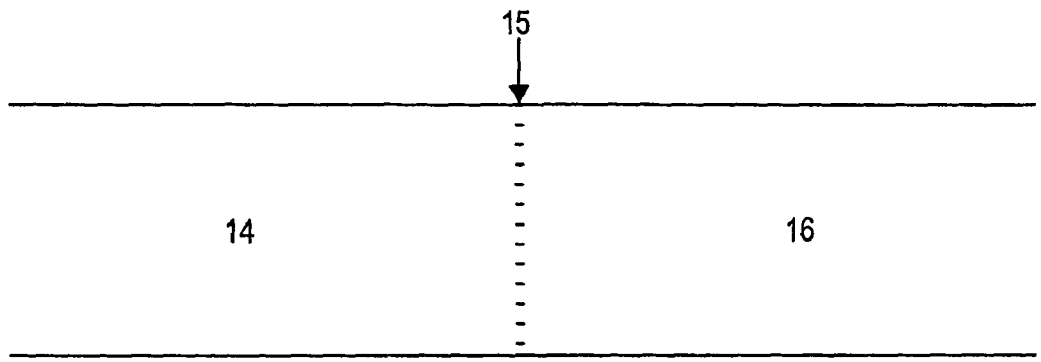
FIG. 7 is a schematic representation of a microfluidic system according to the present invention comprising an inlet and an outlet.

FIG. 7 shows a membrane 15 according to the present invention embedded into a channel structure with an inlet 14 and an outlet 16. Liquid can be introduced into the inlet 14 with an overpressure, which is smaller than the positive holding pressure of the device, forcing the air in front of the liquid out through the membrane apertures. As the liquid surface reaches the membrane, the device will seal, enabling pressure driven applications to run without being connected to air volumes, which in some cases can affect the success of the application.

Applying a short pressure pulse to the inlet 14 (for 0.1-10 seconds) with a magnitude larger than the positive holding pressure, will break the seal, and enable the passing of liquid through the membrane. If a limited volume of liquid has been introduced into the inlet 14 driven by external gas pressure or by other means of airflow, the liquid will continue to pass through the device until the entire available liquid volume has passed through the membrane into the outlet. When air again reaches the membrane, the device will return to the sealing state, enabling pressure driven applications to function in the outlet 16 region.

Figure 8A:
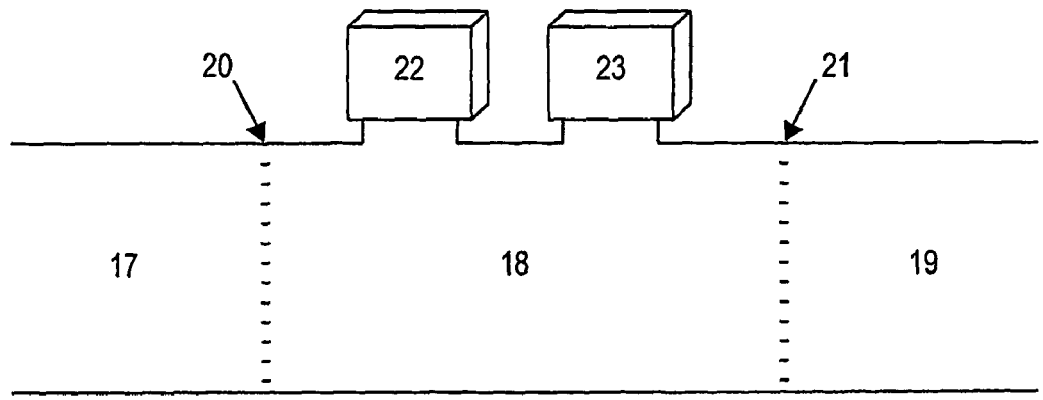
FIGS. 8a and 8b are schematic representations of further embodiments of a microfluidic system according to the present invention.

FIG. 8a shows a more complicated fluidic system with an inlet 17, an enclosed volume 18, an outlet 19, a first membrane 20, a second membrane 21, a pumping device 22, and a measurement apparatus or other fluidic system where pumping is required 23. A configuration like this is preferred if the physical dimensions of the devices 22 and 23 are so small that surface tension forces and high flow resistance in these makes it troublesome to prime the enclosed volume 18 through these. After priming it is required that the two membranes 20 and 19 enter the sealing states, in order to enable the pump 22 to act on the measurement apparatus 23.

To prime the enclosed volume 18, an amount of liquid should be introduced into the inlet 17 having the same volume as the enclosed volume 18 plus some extra to account for the tolerances in the system, ensuring in all cases sufficient liquid for the priming. Gas pressure lower than the positive holding pressure of membrane 20 should be applied to the inlet 17 for a sufficient length of time to allow the liquid to reach the membranes 21, 20. Following this, a short pressure pulse (0.1-10 seconds) larger than the positive holding pressure of membrane 20 should be applied in order to force liquid through the apertures of the membrane 20. Then a positive pressure lower than the negative holding pressure of membrane 20 should be kept at inlet 17 in order to transfer the liquid into the enclosed volume 18. The air in volume 18 will be vented through the second membrane 21. At some point the liquid will reach the second membrane 21 causing it to enter its sealing state.

At this point a left over amount of liquid will be present in the inlet channel 17. Gas pressure should be kept on this inlet after priming the other parts of the liquid system in the pump 22 and measurement apparatus 23. This will ensure that the excessive liquid in inlet 17 is transferred to pump 22 and apparatus 23. When this transfer has completed, the device 20 will enter its sealing state, completing the priming process.

Figure 8B:
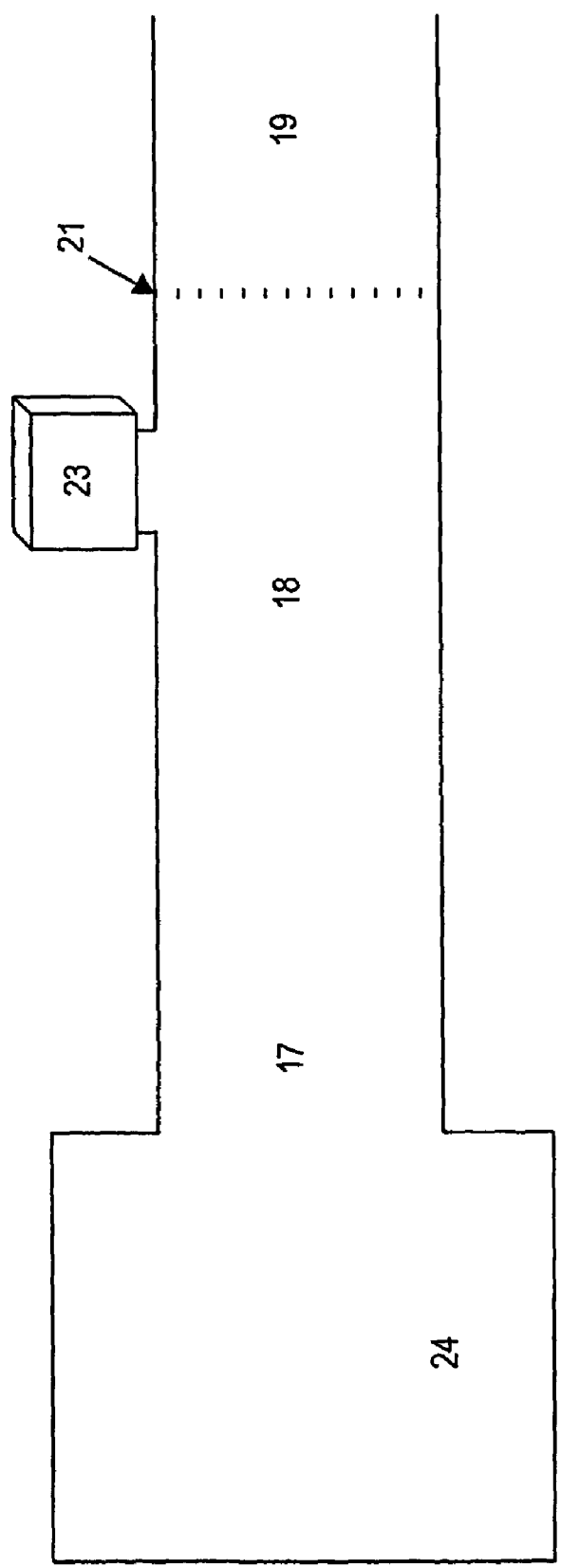

In FIG. 8b, another example is shown, where a fluidic system with an inlet 17, an enclosed volume 18, an outlet 19, a membrane 21, a pumping device 24, and a measurement apparatus or other fluidic system where pumping is required 23.

To prime the enclosed volume 18, an amount of liquid should be introduced into the inlet 17, before this is connected to the pumping device. The liquid should have the same volume as the enclosed volume 18 plus some extra to account for the tolerances in the system, ensuring in all cases sufficient liquid for the priming. The pumping device should then be connected and gas pressure within the range between the negative and positive holding pressure of membrane 21 can now be exerted on the measurement apparatus 23 by the pumping device.

The membrane material can, in general, be any hydrophilic material suitable for micropatterning, such as oxidised silicon, silicon nitride, glass, silica, alumina, oxidised aluminium, acrylic. The apertures in the membrane can be fabricated using laser milling, micro-drilling, sand blasting, with a high-pressure water jet, with photolithographic techniques, or with other methods for micro-fabrication.

Figure 9:
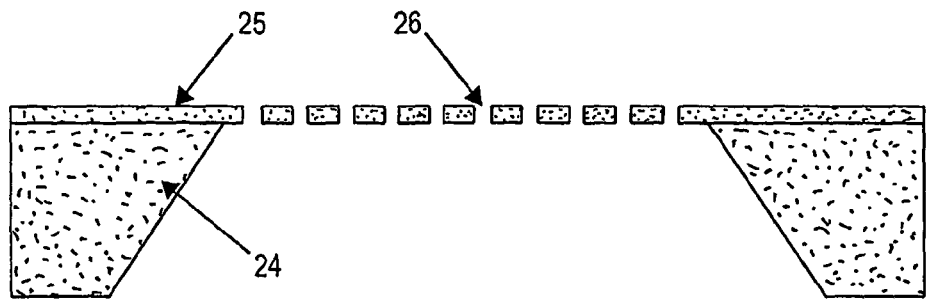
FIG. 9 is a schematic representation of another embodiment of a microfluidic system according to the present invention in which the membrane is formed from silicon.

A preferred embodiment is shown in FIG. 9 where a membrane with holes is defined on a silicon substrate using standard MEMS technology (See reference 2). The structure consists of a silicon substrate 24, a membrane 25, and pores defined lithographically and etched into the membrane 26. This can for example be done through the following process:
1) The starting material is a silicon wafer with a 100 surface.
2) One surface of the silicon is coated with photoresist and the pattern containing the locations and diameters is transferred to the photoresist through exposure to UV light.
3) The aperture pattern is transferred to the silicon with Deep Reactive Ion Etch (DRIE) or Advanced Silicon Etching (ASE) using an Inductively Coupled Plasma (ICP), resulting in deep vertical pores with a depth of 1-50 µm.
4) The silicon surface is coated with silicon nitride using Low Pressure Chemical Vapour Deposition (LPCVD).
5) The opposite side of the wafer (the bottom side) is coated with photoresist and a pattern containing the membrane defining openings in the silicon nitride is transferred to the photoresist through exposure to UV light.
6) The silicon nitride is etched away on the bottom side of the wafer in the regions defined by the openings in the photoresist, using Reactive Ion Etch (RIE).
7) The wafer is etched anisotropically in a KOH solution, resulting in a pyramidal opening on the bottom side of the wafer. The timing of the etching defines the thickness of the remaining membrane of silicon at the topside of the wafer. Alternatively boron doping can be used to define an etch stop, giving a better control of the thickness.
8) The silicon nitride is removed through wet chemical etching, for example in phosphoric acid at 160° C.
9) The silicon is coated with silicon oxide, either through thermal oxidation or with LPCVD.

Alternatively the substrate can be fabricated through the following process:
1) The starting material is a silicon wafer with a 100 surface.
2) The silicon surface is coated with silicon nitride using Low Pressure Chemical Vapor Deposition (LPCVD).
3) The bottom side of the wafer is coated with photoresist and a pattern containing the membrane defining openings in the silicon nitride is transferred to the photoresist through exposure to UV light.
4) The silicon nitride is etched away on the bottom side of the wafer in the regions defined by the openings in the photoresist, using Reactive Ion Etch (RIE).
5) The wafer is etched anisotropically in a KOH solution, resulting in a pyramidal opening on the bottom side of the wafer. The timing of the etching defines the thickness of the remaining membrane of silicon at the topside of the wafer. Alternatively boron doping can be used to define an etch stop, giving a better control of the thickness. Alternatively the silicon can be etched through the entire thickness of the wafer, leaving only the silicon nitride on the top surface as a thin membrane.
6) The top surface of the wafer is coated with photoresist and the pattern containing the pore locations and diameters is transferred to the photoresist through exposure to UV light.
7) The pore pattern is transferred to the silicon with Deep Reactive Ion Etch (DRIE) or Advanced Silicon Etching (ASE) using an Inductively Coupled Plasma (ICP), resulting in deep vertical pores with a depth of 1-50 µm.
8) The silicon is coated with silicon oxide, either through thermal oxidation, with plasma enhanced chemical vapor deposition (PECVD) or with LPCVD.

Alternatively the substrate can be fabricated through the following process:
1) The starting material is a silicon-on-insulator (SOI) wafer with a 100 surface, and a buried oxide layer located 1-50 µm below the top surface.

2) The wafer surface is coated with silicon nitride using Low Pressure Chemical Vapor Deposition (LPCVD).
3) The bottom side of the wafer is coated with photoresist and a pattern containing the membrane defining openings in the silicon nitride is transferred to the photoresist through exposure to UV light.
4) The silicon nitride is etched away on the bottom side of the wafer in the regions defined by the openings in the photoresist, using Reactive Ion Etch (RIE).
5) The wafer is etched anisotropically in a KOH solution, resulting in a pyramidal opening on the bottom side of the wafer. The buried oxide layer will serve as an etch stop for the anisotropic etch, resulting in a membrane thickness defined by the depth of the oxide layer.
6) The top surface of the wafer is coated with photoresist and the pattern containing the pore locations and diameters is transferred to the photoresist through exposure to UV light.
7) The pore pattern is transferred to the silicon with Deep Reactive Ion Etch (DRIE) or Advanced Silicon Etching (ASE) using an Inductively Coupled Plasma (ICP), resulting in deep vertical pores down to the depth of the buried oxide layer.
8) The exposed regions of the buried oxide layer are removed through RIE, wet hydrofluoric acid (HF) etch, or HF vapor etch. This will ensure contact between the top and bottom openings in the wafer.
9) The silicon is coated with silicon oxide, either through thermal oxidation, with plasma enhanced chemical vapor deposition (PECVD) or with LPCVD.

Alternatively the substrate can be fabricated through the following process:
1) The starting material is a silicon-on-insulator (SOI) wafer with a buried oxide layer located 1-50 µm below the top surface.
2) The bottom side of the wafer is coated with photoresist and a pattern containing the membrane defining openings in the silicon is transferred to the photoresist through exposure to UV light.
3) The membrane pattern is transferred to the silicon with Deep Reactive Ion Etch (DRIE) or Advanced Silicon Etching (ASE) using an Inductively Coupled Plasma (ICP), resulting in vertical cavities down to the depth of the buried oxide layer.
4) The top surface of the wafer is coated with photoresist and the pattern containing the pore locations and diameters is transferred to the photoresist through exposure to UV light.
5) The pore pattern is transferred to the silicon with Deep Reactive Ion Etch (DRIE) or Advanced Silicon Etching (ASE) using an Inductively Coupled Plasma (ICP), resulting in deep vertical pores down to the depth of the buried oxide layer.
6) The exposed regions of the buried oxide layer are removed through RIE, wet hydrofluoric acid (HF) etch, or HF vapor etch. This will ensure contact between the top and bottom openings in the wafer.
7) The silicon is coated with silicon oxide, either through thermal oxidation, with plasma enhanced chemical vapor deposition (PECVD) or with LPCVD.

Alternatively the substrate can be fabricated through the following process:
1) The starting material is a thin polymer sheet, for example made of polymethyl-methacrylate, polyester, polyimide, polypropylene, epoxy, or polyethylene, and with a thickness of 5-100 µm.
2) The sheet substrate should be suspended on a frame of plastic or other suitable material.
3) Pores in the substrate are fabricated using laser milling, micro drilling, sand blasting, or with a high-pressure water jet.
4) The substrate is coated with silicon oxide, glass or silica, at least in a region around the pores, through a low energy plasma enhanced chemical vapor deposition process.

Alternatively the substrate can be fabricated through the following process:
1) The starting material is a thin sheet of UV curing epoxy or acrylic, for example SU-8. The sheet should have a thickness of 5-100 µm.
2) The sheet substrate should be suspended on a frame of plastic or other suitable material.
3) The substrate is exposed to UV light through a standard photolithography glass mask with the pattern containing the pore locations and diameters.
4) The substrate is submerged in a developing solvent which removes the substrate polymer in the regions which were not exposed to UV light, resulting in pores penetrating the thin sheet.
5) The substrate is coated with silicon oxide, glass or silica, at least in a region around the pores, through a low energy plasma enhanced chemical vapor deposition process.

Alternatively the substrate can be fabricated through the following process:
1) The starting material is a glass wafer, for example Pyrex or borosilicate.
2) The bottom side of the wafer is coated with photoresist and a pattern containing the membrane defining openings is transferred to the photoresist through exposure to UV light.
3) The glass is etched away on the bottom side with HF vapor, or with HF in an aqueous solution while the front side is protected, thinning down the wafer to a thickness of 2-50 µm in selected regions.
4) The top surface of the wafer is coated with photoresist and the pattern containing the pore locations and diameters is transferred to the photoresist through exposure to UV light.
5) The pore pattern is transferred to the silicon with Deep Reactive Ion Etch (DRIE) or Advanced Oxide Etching (ASE) using an Inductively Coupled Plasma (ICP). This should result in deep vertical pores down to the depth of the cavity opened from the bottom side, ensuring contact between the two sides of the wafer.

Alternatively the substrate can be fabricated through the following process:
6) The starting material is a glass wafer, for example Pyrex or borosilicate.
7) The bottom side of the wafer is coated with photoresist and a pattern containing the membrane defining openings is transferred to the photoresist through exposure to UV light.
8) The glass is etched away on the bottom side with HF vapor, or with HF in an aqueous solution while the front side is protected, thinning down the wafer to a thickness of 2-50 µm in selected regions.
9) The top surface of the wafer is bombarded with a focused ion beam in a pattern defining the pore locations and diameters, weakening the glass material in these regions.
10) The wafer is etched with HF vapor, or with HF in an aqueous solution. The regions exposed to the focused ion beam will etch significantly faster than the rest of the wafer, resulting in pores forming between the top surface and the cavity opened from the bottom side, ensuring contact between the two sides of the wafer.

Alternatively the substrate can be fabricated through the following process:
11) The starting material is a glass wafer, for example Pyrex or borosilicate.

12) The bottom side of the wafer is coated with photoresist and a pattern containing the membrane defining openings is transferred to the photoresist through exposure to TV light.
13) The pattern is transferred to the glass with Deep Reactive Ion Etch (DRIE) or Advanced Oxide Etching (AOE) using an Inductively Coupled Plasma (ICP). This defines membranes in the top surface of the wafer, which should have a thickness of 2-100 μm.
14) The top surface of the wafer is coated with photoresist and the pattern containing the pore locations and diameters is transferred to the photoresist through exposure to UV light.
15) The pore pattern is transferred to the silicon with Deep Reactive Ion Etch (DRIE) or Advanced Oxide Etching (AOE) using an Inductively Coupled Plasma (ICP). This should result in deep vertical pores down to the depth of the cavity opened from the bottom side, ensuring contact between the two sides of the wafer.

Alternatively a membrane can be defined in silicon nitride alone using a similar process.

The main advantage of fabricating the present invention using the above mentioned silicon technology is that it makes it possible to integrate it with silicon microfluidics systems. As an example we demonstrate here how the invention can be integrated into a silicon-based device for doing electrophysiology measurements, with the purpose of easing the priming process.

In reference 3, a description of a device is disclosed which consists of an aperture for obtaining a high resistance seal to a cell, and an electroosmotic flow pump which is used to apply suction to the aperture with the purpose of trapping and manipulating the cell. The aperture can be defined in a silicon membrane in the same manner as the present invention.

In reference 4 an electroosmotic pumping device based on silicon technology is disclosed. This device can be fabricated as an array of apertures in a silicon membrane in the same manner as the present invention.

Figure 10:
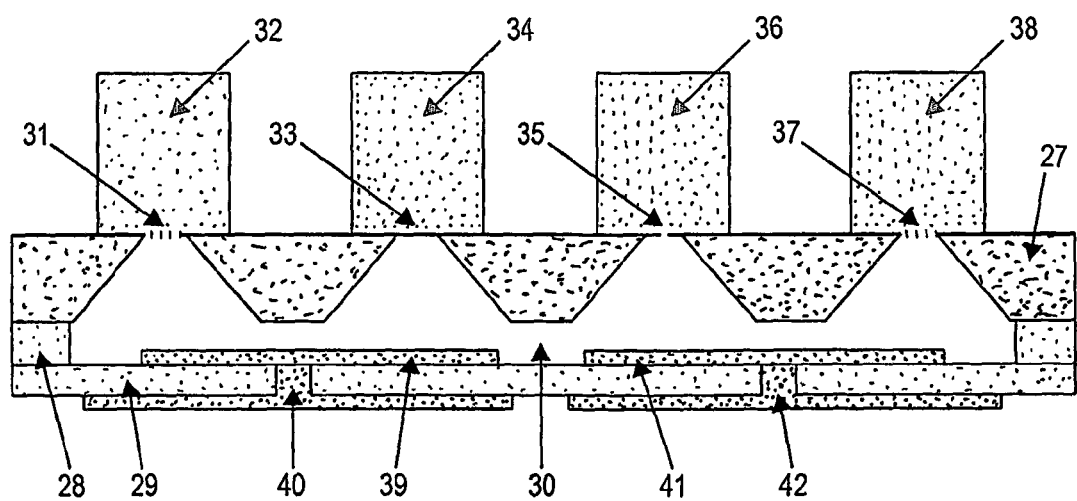
FIG. 10 is a schematic representation showing an integration of an aperture during an electrophysiology measurement, an electroosmotic flow pump, and two membranes according to the present invention monolithically integrated on a silicon chip.

FIG. 10 shows an integration of an aperture for carrying out electrophysiology measurements, an electroosmotic flow pump, and two systems according to the present invention, monolithically integrated on a silicon chip 27. This chip system is an embodiment of the system shown in FIG. 9. The bottom side of the silicon is sealed off using a channel defining layer 28 and a bottom plate containing an electrochemical electrode 29. The pieces 28 and 29 could alternatively be made in one piece. The pieces 27, 28, and 29 could be bonded or glued on wafer scale or on a single die level.

For the chip to operate properly the enclosed volume 30 should be filled with liquid; a priming inlet formed from membrane 31; and a venting outlet formed from membrane 37 should be sealed off. Membrane 31 has an inlet channel 32 where liquid is initially introduced. The apertures of membrane 31 have a radius of 1.5-4 μm. The membrane could optionally be coated with a hydrophobic material.

The electroosmotic flow pump 33 has a topside fluidic system 34 containing a liquid inlet and an electrochemical electrode. The apertures of pump 33 have a radius of 0.2-0.7 μm. The aperture for carrying out electrophysiology measurements 35 consists of a single aperture with a radius of 0.3-1.0 μm in a membrane. A fluidics system 36 exists containing an inlet for cells and at least one electrochemical electrode.

The membrane 37 has a venting channel 38 where the air originally contained in the enclosed volume can be expelled. The sieve apertures of membrane 37 have a radius of 1.5-4 μm. The membrane could optionally be coated with a hydrophobic material.

Membranes 31, 37, pump 33 and the membrane defining aperture 35 can be made with the same membrane thickness of 1-50 μm. Electrochemical electrodes 39 and 41 can be included in the enclosed volume 30, and contacted with through-holes in the bottom plate 29 to contact pads 40 and 42.

Figure 11:
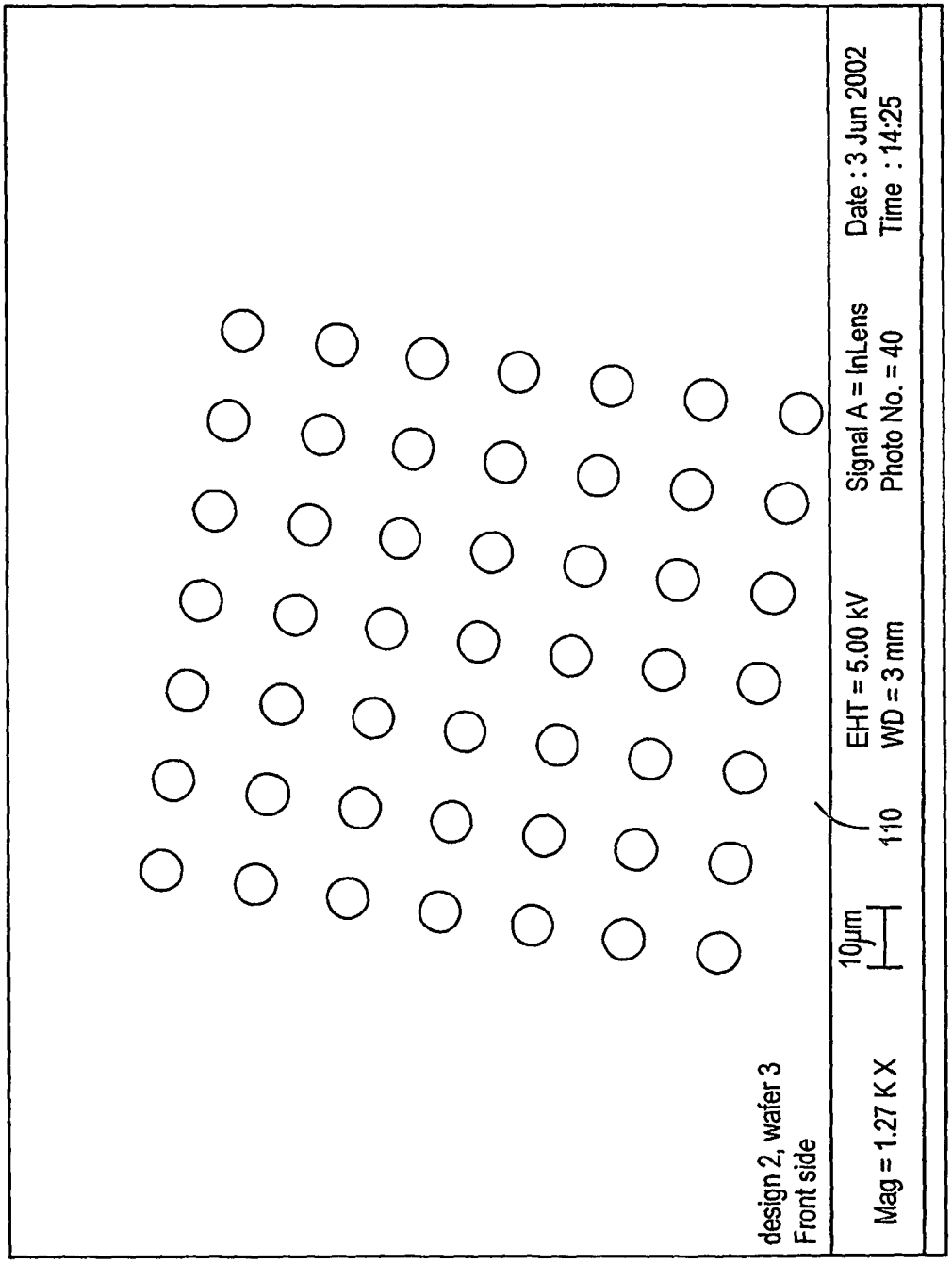
FIG. 11 shows a scanning electron micrograph of a fabricated membrane according to the present invention.

FIG. 11 shows a scanning electron micrograph of a fabricated membrane 110 according to the present invention. The membrane has a 14 μm thick silicon membrane made on a 380 μm thick Si wafer by means of anisotropic etch. The 3.5 μm radius apertures were etched with Deep Reactive Ion Etch (DRIE). The silicon surfaces including the interior of the holes were coated with a thin layer of silicon oxide (quartz).

The devices were packaged in plastic housings with fluidic channels on the top and bottom side, in a configuration as shown in FIG. 7. The devices were tested by adding 20 μl of water with a small amount of malachite green dye to the channel on the topside of the device. A gas pressure of +50 mbar was then applied for 10 s in order to fill the channel until the liquid reached the membrane. Increasing suction or pressure was applied in periods of either 30 or 60 s. A microscope was used to monitor breaches of the sealing state. After a breach the highest pressure/suction used was noted, and the second highest pressure/suction used was noted as the apparent lower limit of that particular device.

Figure 1A:
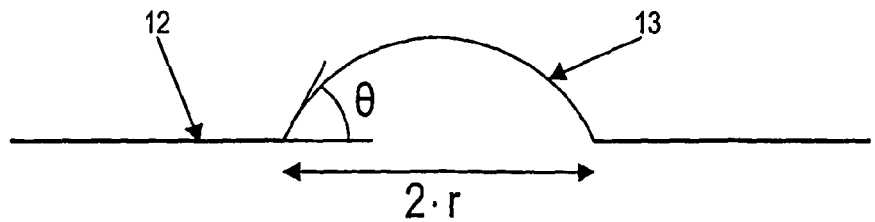
FIG. 1a is a schematic representation of a membrane according to the present invention showing an aperture forming part of the membrane.
Figure 1B:
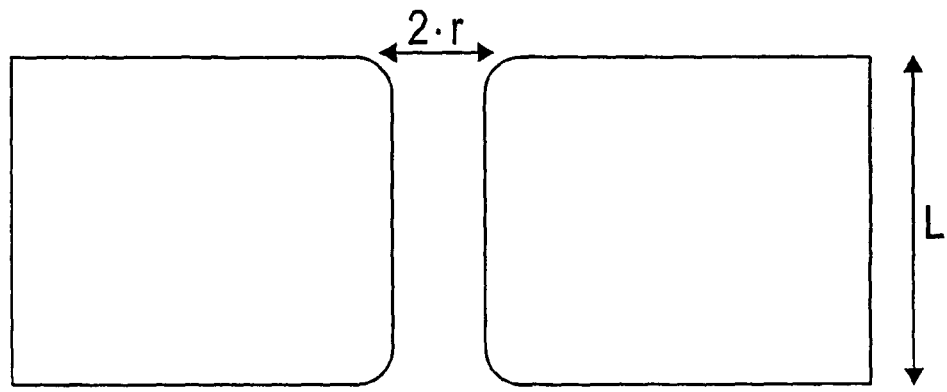
Figure 1C:
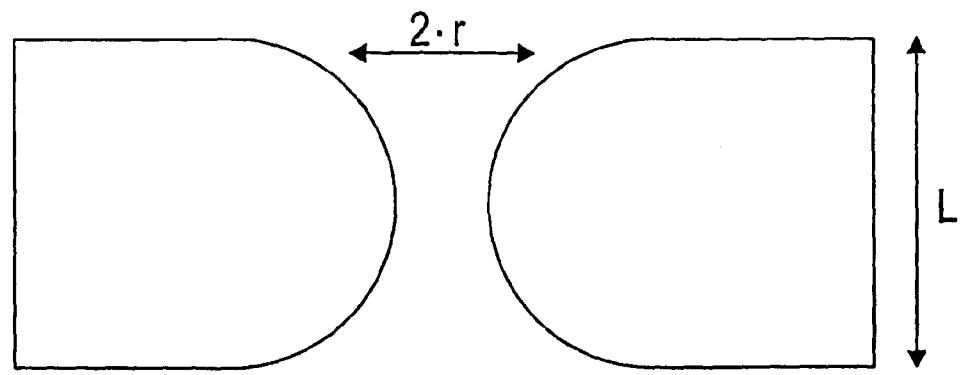
Figure 2:
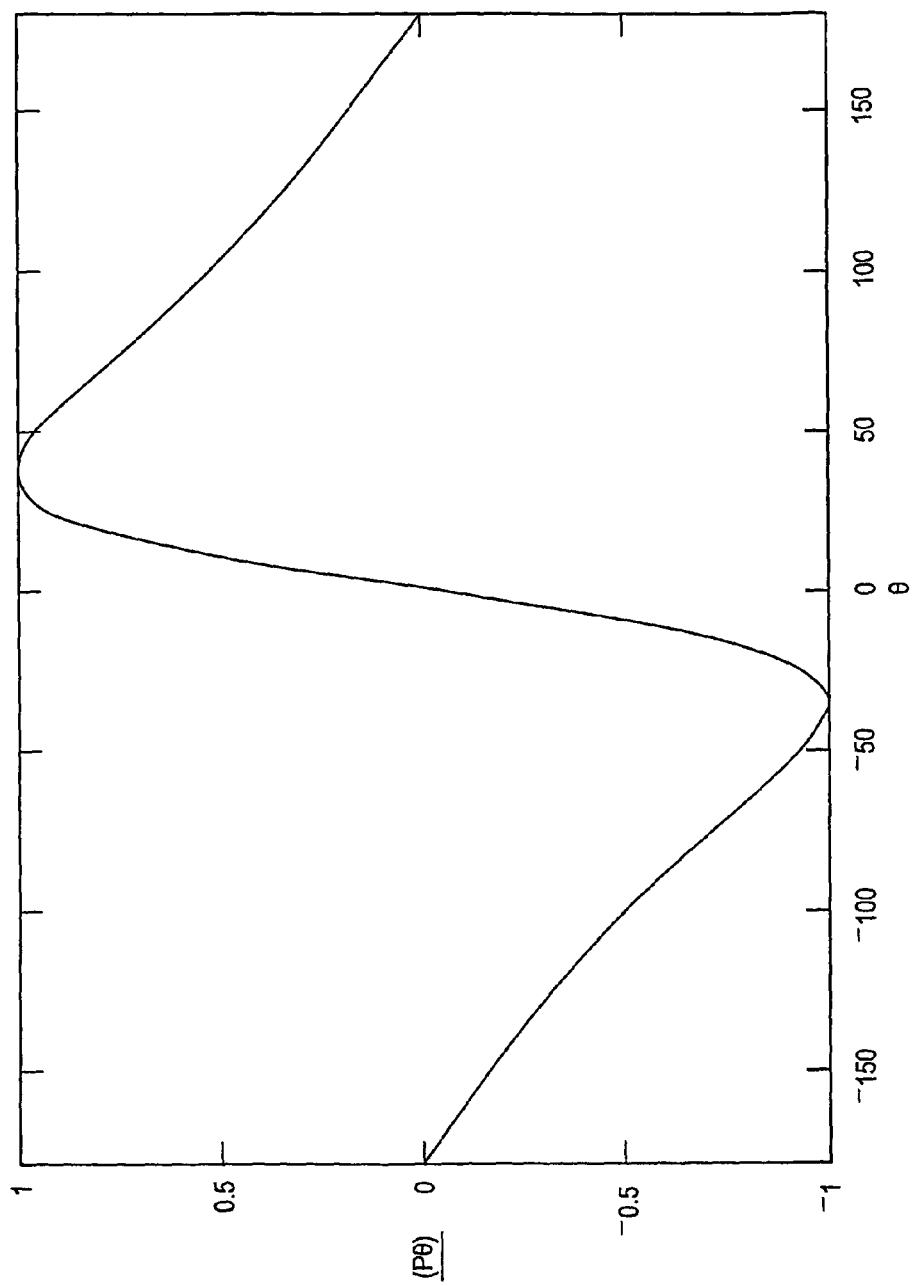
Figure 3A:
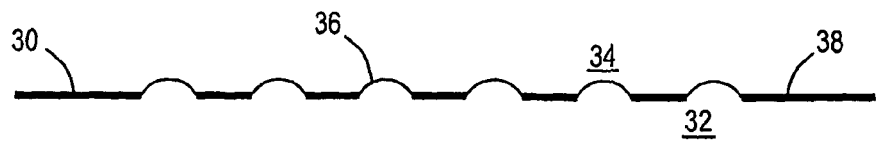
FIGS. 3a to 3d are schematic representations of the membrane according to the present invention in various configurations of the sealing space.

There did not seem to be any difference between the results obtained after applying pressure/suction for 30 or 60 s, nor between priming from either side of the device. The results have therefore been grouped only with regard to whether pressure or suction was used. The results for positive pressure, corresponding to the situation in FIG. 3a, are summarised in Table 3.

TABLE 3

Experimental positive holding pressures.

| Lower limit > +100 mbar | Lower limit > +150 mbar | Lower limit > +175 mbar | Lower limit > +200 mbar | Lower limit > +230 mbar |
| --- | --- | --- | --- | --- |
| 13/13 = 100% | 12/13 = 92% | 10/13 = 77% | 5/13 = 38% | 0/13 = 0% |

Figure 3B:
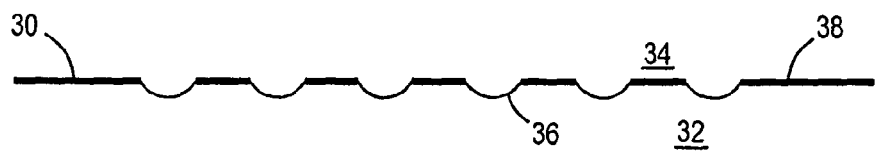

In all of 13 chips tested, 100 mbar had no effect on the sealing capability. In one chip the seal breached at 150 mbar giving a lower limit of 100 mbar, and so on. The results for negative pressure, corresponding to the situation in FIG. 3b, are summarised in Table 4.

TABLE 4

Experimental negative holding pressures.

| Lower limit < −150 mbar | Lower limit < −300 mbar | Lower limit < −350 mbar |
| --- | --- | --- |
| 5/5 = 100% | 5/5 = 100% | 0/5 = 0% |

When the device is used as shown in FIG. 8a and FIG. 10, the sealing capabilities are important in the situation where both sides of the membrane are wetted. Experiments were therefore performed with the following protocol:

1) 10 μl of water containing malachite green was introduced into the inlet with a pressure of +50 mbar for 10 seconds, ensuring that the liquid surface reached the membrane.
2) A 3 second gas pressure pulse of 300 mbar was then applied to the inlet, enabling the passing of liquid through the device.
3) A pressure of +50 mbar was applied to the inlet for 5 minutes, ensuring that the entire available liquid volume had passed through the device into the outlet, causing the device to seal.

Figure 3C:
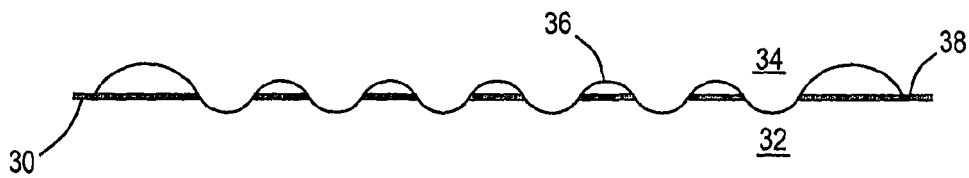
Figure 3D:
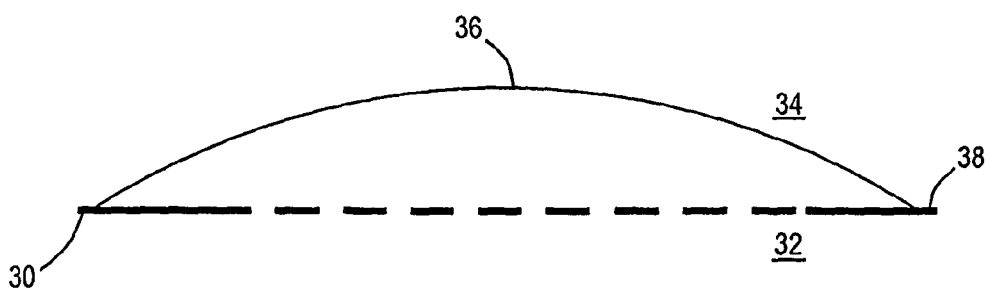

4) For 8 different chips, increasing positive pressures were applied to the outlet, corresponding to the situation in FIG. 3d, while monitoring the breaching of the seal and consecutive re-filling of the inlet. The results are summarised in Table 5.
5) For 6 different chips, increasing negative pressures were applied to the outlet, corresponding to the situation in FIG. 3c, while monitoring the breaching of the seal. The results are summarised in Table 6.

TABLE 5

Experimental positive holding pressures with both sides wetted.

| Lower limit > +10 mbar | Lower limit > +20 mbar | Lower limit > +30 mbar | Lower limit > +40 mbar | Lower limit > +50 mbar | Lower limit > +60 mbar |
|---|---|---|---|---|---|
| 8/8 = 100% | 7/8 = 88% | 5/8 = 63% | 4/8 = 50% | 2/8 = 25% | 1/8 = 13% |

TABLE 6

Experimental negative holding pressures with both sides wetted.

| Lower limit < −250 mbar | Lower limit < −300 mbar | Lower limit < −400 mbar |
|---|---|---|
| 6/6 = 100% | 4/6 = 67% | 2/6 = 33% |

In conclusion the experimental data revealed holding pressures in good agreement with the theoretical predictions. Measured negative holding pressures are larger than the positive, as predicted for membranes with small contact angles. The ratio between positive and negative holding pressures in Tables 3 and 4 can be used to extrapolate the contact angle of the membrane to be $\tau=11°$, which is in good accordance with the membrane being made of silicon oxide.

The experiments where both sides of the membranes were wetted showed, as predicted, a large difference between positive and negative holding pressures. This makes the device most suitable in applications where negative pressures are needed, while small positive pressures can still be applied. The device can in these situations be improved by coating the intended dry side of the membrane with a hydrophobic material.

REFERENCES

[1] Biomaterials Properties Database, University of Michigan, Contact: Dr William J. O'Brien, Director (FAX: 313-647-5293). Quintessence Publishing, 1996. http://www.lib.umich.edu/libhome/Dentistry.lib/Dental_tables/Contangle.html
[2] Madou, M., "Fundamentals of Microfabrication", 2nd Ed (December 2001) CRC Press; ISBN: 0849308267.
[3] International Patent Publication No. WO 02/29402.
[4] Pending patent application, J. Kutchinsky, R. Taboryski, M. Bech, Filing date: Feb. 10, 2001.

The invention claimed is:

1. A microfluidics system for determining and/or monitoring electrophysiological properties of ion channels in ion channel-containing structures comprising:
a channel having an inlet and an outlet;
a first membrane positioned between and spaced apart from both the inlet and outlet and comprising an aperture having a radius within the range 0.1 to 50 μm, the inlet and the outlet being in hydraulic communication with one another, such that a fluid can move along the channel from the inlet to the outlet;
pressure means for creating a pressure difference between the inlet and the outlet, whereby, movement of a fluid within the channel will be halted at the first membrane, due to a surface tension created in the fluid at the aperture, until the pressure means creates a pressure difference between the inlet and the outlet that exceeds the surface tension created at the aperture, so that electrophysiological properties of ion channels in ion channel-containing structures can be determined and/or monitored, and
a second membrane comprising an aperture having a radius within the range 0.1 to 50 μm, and being positioned between the inlet and the first volume, wherein
the pressure means comprises a pumping device, the system further comprising an enclosed first volume positioned between the inlet and outlet, a second volume in hydraulic communication with the first volume; the pumping device being in hydraulic communication with the first and second volumes, for pumping fluid through the system or for exerting a hydraulic pressure difference between the first and second volume, the first membrane being positioned between the outlet and the first volume.

2. A system according to claim 1 wherein the first membrane comprises a plurality of apertures.

3. A system according to claim 1 comprising a plurality of second volumes.

4. A system according to claim 1 wherein the second volume comprises a second inlet.

5. A system according to claim 1 wherein the second volume comprises a second outlet.

6. A system according to claim 1, wherein the second membrane comprises a plurality of apertures.

7. A system according to claim 6 wherein the membrane is formed from oxidised silicon, silicon nitride, glass, silica, alumina, oxidised aluminium or acrylic.

8. A system according to claim 6 wherein the system is formed from silicon.

9. A system according to claim 1 wherein the membranes comprises a hydrophilic material.

10. A system according to claim 1 wherein the membrane is coated on at least one side with a hydrophobic material.

11. A system according to claim 10 wherein the hydrophobic material comprises PTFE or PDMS.

12. A system according to claim 1 wherein the radius of the aperture falls within the range of 0.1 to 50 pm.

13. A membrane forming a microfluidic system according to claim 1.

14. A membrane forming part of a microfluidic system according to claim 1.

15. A device for taking electrophysiological measurements comprising a system according to claim 1.

* * * * *